UNITED STATES PATENT OFFICE.

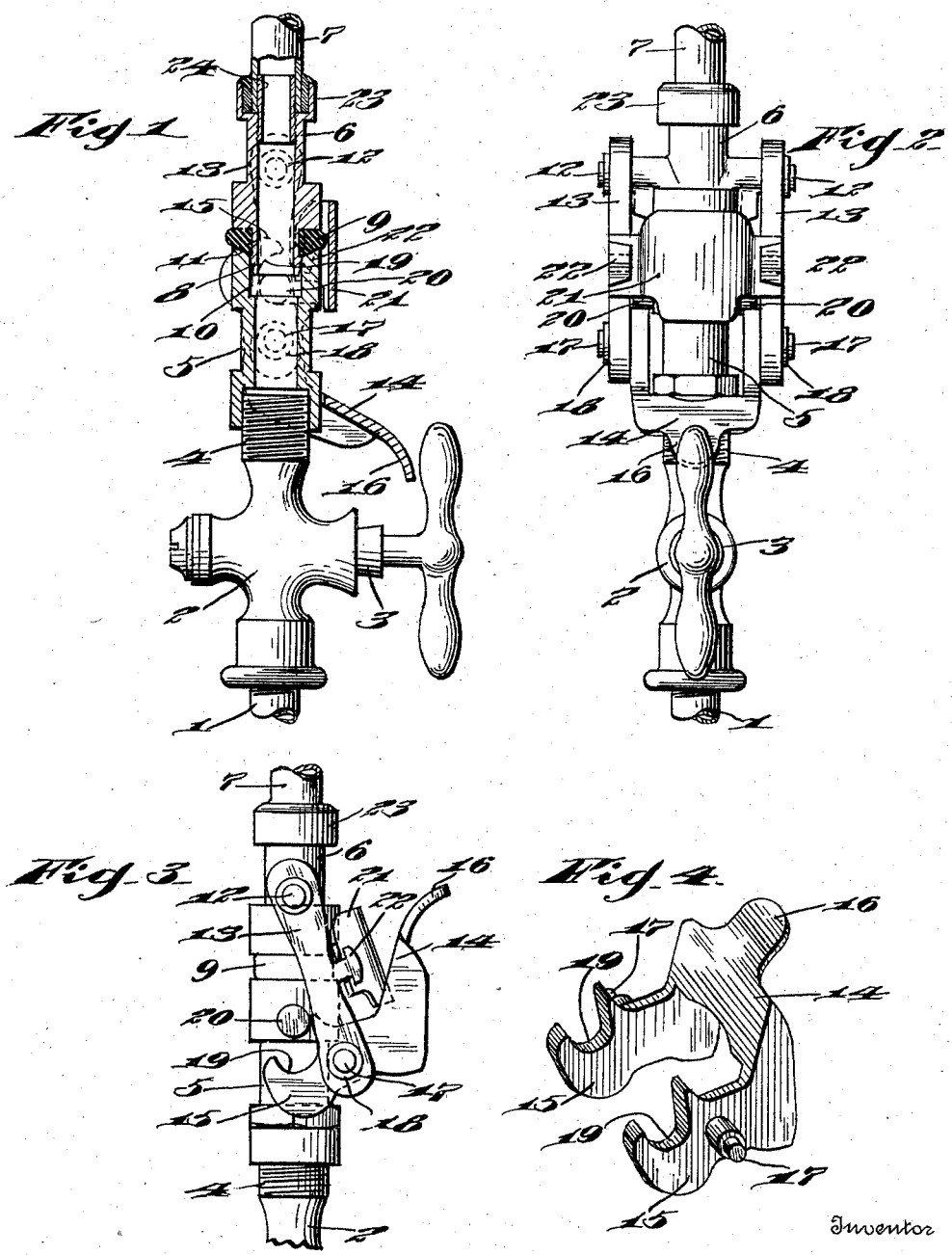

ADOLPH LANG, OF PHILADELPHIA, PENNSYLVANIA.

PIPE-COUPLING.

966,928.  Specification of Letters Patent.  Patented Aug. 9, 1910.

Application filed April 9, 1910. Serial No. 554,325.

*To all whom it may concern:*

Be it known that I, ADOLPH LANG, a citizen of the United States, residing at Philadelphia, in the county of Philadelphia and State of Pennsylvania, have invented certain new and useful Improvements in Pipe-Couplings, of which the following is a specification.

My invention relates to improvements in pipe couplings, more particularly designed for use in beer pipes, the object of the invention being to provide an improved coupling located adjacent the barrel, so that the pipe connecting the barrel with the faucet back of the bar may be readily connected and disconnected from the pipe at the barrel.

A further object is to provide an improved construction of coupling members and an improved lever for locking them together.

With these and other objects in view, the invention consists in certain novel features of construction and combinations and arrangements of parts, as will be more fully hereinafter described and pointed out in the claims.

In the accompanying drawings: Figure 1, is a view partly in longitudinal section, illustrating my improvements. Fig. 2, is a view in elevation at right angles to Fig. 1. Fig. 3, is a view in side elevation showing the clamping lever in its open position, and Fig. 4, is a perspective view of the clamping lever.

1 represents the pipe, which is adapted to be projected into the beer barrel, and 2 is a cock in said pipe containing a suitable plug valve 3, for regulating the flow through the pipe. The outer end of this cock 2 is screw threaded, as shown at 4, to engage in internal screw threads in one of my improved coupling members 5. 6, represents the other of my improved coupling members, which is secured to the pipe 7 for conveying the beer to the faucet at the bar. Coupling member 6 is provided on its lower end with a tubular teat 8, having an annular groove therein to receive a washer 9, preferably of rubber, but which of course may be of other suitable material.

The end of member 5 is made in the form of a socket 10, to receive the teat 8, and the extreme end of this member 5 is beveled inwardly as shown at 11, so that when the members 5, and 6, are pressed toward each other, the beveled end 11 will tend to press washer 9 inwardly and not spread it outwardly as would be the case were the end of the member 5 flat, and by reason of this construction a better and tighter joint is had.

Member 6 is provided at opposite sides, with trunnions 12, on which links 13 are pivotally secured. To the free ends of these links 13, my improved lever 14 is pivotally secured. This lever 14 comprises a casting having two side members 15, 15, connected by a cross member or finger hold 16. On each of these members 15, a trunnion 17 is made integral and is pivotally secured in the free ends of the links 13. These trunnions 15, and the trunnions 12, are preferably secured in openings in the links, by first inserting washers 18 on the trunnions, and then upsetting or enlarging the ends of the trunnions as illustrated.

The members 15, 15, are each provided with recesses 19, which engage lugs 20, on member 5, and when the lever is moved so that its recesses 19 engage the lugs 20, and the hand hold 16, is swung downward, lugs 20 serving as a fulcrum, the links 13 and the member 6 will be drawn downward so as to thoroughly clamp the washer 9 between the members, and as the fulcrum point 20 will pass between the pivot points 12 and 17, the lever will be effectually locked in closed position, and it will require some little force to lift the free end of the lever.

A splash plate 21 connects links 13, and may of course be secured in various ways, but a preferable way is to provide T-shaped lugs 22 on the links 13, and recesses 23 in the ends of the plate 21, which when positioned in line with the lugs, and the plate bent, will serve to effectually hold the plate on the links. This plate is so located that it registers with the meeting ends of the members 5 and 6, so that when the coupling members are separated, this plate will prevent any beer which may be in the pipe from splashing into the face of the operator.

Coupling member 6 and pipe 7 are secured together in an improved way, as will now be explained. Member 6 has a flaring flange 23 and is internally screw threaded to receive a tube 24 extending above the flange and forming an annular receptacle in which the end of the pipe 7 is positioned and secured by lead or other soft metal poured in molten form into said receptacle around pipe 7.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a pipe coupling, the combination with two tubular members, of a teat on one member projecting into the other member, a washer around said teat and located between the members, links pivotally connected to one of said members, lugs on the other of said members, a lever comprising two members pivotally connected between their ends to the free ends of said links, and constructed to engage at their ends said lugs, and a plate connecting said links, and extending across the coupling members at their point of juncture, substantially as described.

2. In a pipe coupling, the combination with two members, a teat on one member projected into the other member, the other of said members having an internally beveled end, a washer on said teat, and located between the ends of said members, links pivotally connected to one member, T-shaped lugs on said links, a plate having recessed ends to receive the lugs, a lever pivotally connected to said links, and lugs on one of said members engaged by said lever, substantially as described.

3. In combination with a pipe adapted to be connected to a barrel, and a valve or cock in said pipe, of two coupling members, one member screwed onto said cock and the other member constructed to be connected to a pipe for conveying the liquid to a point of use, a teat on one of said members having an annular groove therein, a washer around the teat and located in said groove, said teat adapted to be projected into the other member, and the washer located between the ends of the members, links pivotally connected to one of said members, T-shaped lugs on said links, a plate having recessed ends to receive the lugs, lugs on the other of said members, and a lever pivotally connected between its ends to the free ends of said links, and recessed ends on said lever to receive said lugs, substantially as described.

In testimony whereof I have signed my name to this specification in the presence of two subscribing witnesses.

ADOLPH LANG.

Witnesses:
   Michael J. Gilmore,
   R. H. Krenkel.